US009614587B2

(12) United States Patent
Burk

(10) Patent No.: US 9,614,587 B2
(45) Date of Patent: *Apr. 4, 2017

(54) POWER LINE COMMUNICATION SYSTEM AND METHOD

(71) Applicant: Panasonic Automotive Systems Company of America, Division of Panasonic Corporation of North America, Peachtree City, GA (US)

(72) Inventor: Michael T. Burk, Peachtree City, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 726 days.

This patent is subject to a terminal disclaimer.

(21) Appl. No.: 13/972,451

(22) Filed: Aug. 21, 2013

(65) Prior Publication Data

US 2013/0336414 A1   Dec. 19, 2013

Related U.S. Application Data

(63) Continuation of application No. 12/658,123, filed on Feb. 3, 2010, now Pat. No. 8,541,903.

(51) Int. Cl.
*H04B 3/54* (2006.01)
*B60L 11/18* (2006.01)
(Continued)

(52) U.S. Cl.
CPC ............... *H04B 3/54* (2013.01); *B60L 1/003* (2013.01); *B60L 1/02* (2013.01); *B60L 3/12* (2013.01);
(Continued)

(58) Field of Classification Search
CPC ........................................................ B60L 5/42
(Continued)

(56) References Cited

U.S. PATENT DOCUMENTS

2007/0022197 A1*   1/2007   Logvinov ........... H04L 12/2812
                                                        709/226
2009/0177580 A1    7/2009   Lowenthal et al.
(Continued)

FOREIGN PATENT DOCUMENTS

WO   2007100073 A1   9/2007
WO   2008073453 A1   7/2008

*Primary Examiner* — Robert Deberadinis
(74) *Attorney, Agent, or Firm* — Laurence S. Roach, Esq.

(57) ABSTRACT

Exemplary embodiments of the present invention relate to a power line communication (PLC) system. For example, the PLC system may include a PLC server configured to provide electrical power and electronic communications through a PLC bus to a number of electronic devices, such as an instrument cluster, infotainment interface, rear-seat entertainment console, aftermarket accessories, and the like. The PLC system may also include a power system that may be coupled to an electrical grid for charging a battery associated with one or more of the electronic devices. The power system may be communicatively coupled to the PLC bus, enabling the devices coupled to the PLC bus to communicate with a service provider through the electrical grid. The communications between the devices coupled to the PLC bus and remote devices coupled through the electrical grid may be conducted using a common communication protocol.

13 Claims, 3 Drawing Sheets

(51) Int. Cl.
  *B60L 1/00* (2006.01)
  *B60L 1/02* (2006.01)
  *B60L 3/12* (2006.01)
  *H02J 3/00* (2006.01)

(52) U.S. Cl.
  CPC ....... *B60L 11/1816* (2013.01); *B60L 11/1824* (2013.01); *B60L 11/1846* (2013.01); *B60L 11/1848* (2013.01); *H04B 3/542* (2013.01); *B60L 2200/32* (2013.01); *B60L 2200/36* (2013.01); *B60L 2210/30* (2013.01); *B60L 2210/40* (2013.01); *B60L 2230/30* (2013.01); *B60L 2240/12* (2013.01); *B60L 2240/34* (2013.01); *B60L 2240/441* (2013.01); *B60L 2240/445* (2013.01); *B60L 2240/622* (2013.01); *B60L 2250/16* (2013.01); *H04B 2203/545* (2013.01); *H04B 2203/547* (2013.01); *H04B 2203/5458* (2013.01); *Y02T 10/7005* (2013.01); *Y02T 10/7072* (2013.01); *Y02T 10/7088* (2013.01); *Y02T 10/7241* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 30/14* (2013.01); *Y10T 307/696* (2015.04); *Y10T 307/724* (2015.04)

(58) Field of Classification Search
  USPC .............................................. 307/9.1, 80, 85
  See application file for complete search history.

(56) References Cited

U.S. PATENT DOCUMENTS

| | | | |
|---|---|---|---|
| 2010/0011228 A1* | 1/2010 | Chen | G06F 1/26 713/300 |
| 2010/0052872 A1* | 3/2010 | Boss | G06Q 30/0613 700/295 |
| 2015/0077056 A1* | 3/2015 | Bridges | G06Q 50/06 320/109 |

* cited by examiner

POWER LINE COMMUNICATION SYSTEM AND METHOD

CROSS-REFERENCE TO RELATED APPLICATION

This application is a continuation of U.S. patent application Ser. No. 12/658,123, filed on Feb. 3, 2010, now U.S. Pat. No. 8,541,903, the disclosure of which is hereby incorporated by reference in its entirety for all purposes.

FIELD OF THE INVENTION

The present invention generally relates to a communication system. More specifically, the present invention relates to a power line communication (PLC) system for a vehicle. In some embodiments, the PLC system can optionally be linked with a service provider through an electrical grid that provides power and electronic communications.

BACKGROUND OF THE INVENTION

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Vehicles, such as cars, trucks, SUVs, minivans, and boats, among others, typically include various media systems. For example, a vehicle may include an AM/FM radio, CD player, satellite radio, navigation systems, media players such as DVD players, and the like. Some vehicles may also provide a local area network (LAN) that enables the vehicle to communicate with a mobile device, for example, a mobile phone, an MP3 player, and the like. However, the connectivity of these various media systems is usually somewhat limited. In other words, most of these media systems are not integrated with one other, and some media systems may not be able to communicate with the outside world. Furthermore, the addition of an aftermarket accessory, for example, a rear-seat DVD player, would likely involve an expensive rewiring process to link the DVD player into the vehicular power and communication system.

SUMMARY OF THE INVENTION

An exemplary embodiment of the present invention provides a power line communication (PLC) system that may include a PLC server configured to provide electrical power and electronic communications through a PLC bus to any number of electronic devices. The system may also include a power system coupled to an electrical grid for charging a battery associated with one or more of the electronic devices. The power system may be communicatively coupled to the PLC bus so that the electronic devices coupled to the PLC bus may communicate electronically with a remote service provider through the electrical grid.

In some exemplary embodiments, the PLC server includes a power conditioner that reduces electrical noise on the PLC bus, thereby eliminating the use of individual power conditioners for each device coupled to the PLC bus. The PLC server may also include a PLC coupler that includes a first communications port coupled to the PLC bus and a second communications port coupled to a multimedia server.

The multimedia server may be configured to send audio signals to an audio subsystem configured to provide audio signals to one or more speakers. The multimedia server may also be configured to receive radio frequency (RF) signals from an RF subsystem configure to receive RF signals from at least one of an FM broadcaster, AM broadcaster, digital radio broadcaster, satellite radio broadcaster, and a global positioning system (GPS) satellite. The multimedia server may also be communicatively coupled to a network gateway configured to provide network communications over a local-area network and a wide area network. In some embodiments, the multimedia server may be configured to provide data communication between the electronic devices coupled to the PLC bus and a remote service provider through the wide area network.

In some exemplary embodiments, the power system may include a bi-directional power inverter that includes circuitry configured to operate in a charging mode and a generation mode. In this embodiment, the power system may also include an energy management system configured to alternatively switch the bi-directional power inverter between the charging mode and the generation mode based, at least in part, on data received from the electrical grid, such as electricity rates and availability.

Other exemplary embodiments of the present invention may include a method of providing electronic communications in a vehicle. The exemplary method may include coupling a power system of the vehicle to an electrical grid. The power system may be configured to receive electrical power from the electrical grid to charge a battery included in the vehicle. The method may also include receiving electronic communications through the electrical grid and transmitting the electronic communications over a PLC bus communicatively coupled to the power system.

In such embodiments, the method may include receiving electricity rates from an electrical utility through the electrical grid and switching the power system to a charge mode based, at least in part, on the electricity rates. The method may also include receiving travel data from an electronic device coupled to the PLC bus, and determining a charge/generation schedule based, at least in part, on the travel data.

In some exemplary embodiments, the method may also include electronically communicating with a home network through the electrical grid. The method may also include receiving digital media from a remote service provider through the electrical grid, wherein the digital media includes at least one of a music file, a movie file, and a GPS navigation map. The method may also include generating a search query for a point of interest, transmitting the search query to a remote service provider through a wide area network communicatively coupled to the PLC bus, receiving a location of the point-of-interest from the remote service provider, and displaying the location on a display of a GPS navigation system. The method may also include coupling an aftermarket device to the PLC bus through a PLC port included in the vehicle. The method may also include using an Web browser included in one of the devices coupled to the PLC bus to access an Internet service provider through the electrical grid. In some embodiments, the method may include sending data corresponding to serviceable condition of the vehicle from an instrument cluster coupled to the PLC bus to an automotive service provider through the electrical grid.

Another exemplary embodiment of the present invention may include a vehicle comprising a PLC bus configured to carry electrical power to a plurality of electronic devices and carry electronic communications between the plurality of electronic devices. The vehicle may also include a power system coupled to an electrical grid for charging a battery of the vehicle and communicatively coupled to the PLC bus for providing electronic communication through the electrical grid between one of the plurality of electronic devices coupled to the PLC bus and a remote service provider.

In such exemplary embodiments, the vehicle may also include a power source configured to power the plurality of electronic devices coupled to the PLC bus and a power conditioner coupled in series between the power source and the PLC bus and configured to reduce electrical noise in the PLC bus. Furthermore, the power system may include an energy management system configured to switch the power system between a charge mode and a generation mode based, at least in part, on data received from an electrical utility through the electrical grid and travel data received from one of the plurality of electronic devices coupled to the PLC bus.

BRIEF DESCRIPTION OF THE DRAWINGS

The above-mentioned and other features and advantages of the present invention, and the manner of attaining them, will become apparent and be better understood by reference to the following description of one embodiment of the invention in conjunction with the accompanying drawings, wherein.

Corresponding reference characters indicate corresponding parts throughout the several views. The exemplifications set out herein illustrate a preferred embodiment of the invention, in one form, and such exemplifications are not to be construed as limiting in any manner the scope of the invention.

DETAILED DESCRIPTION OF THE PREFERRED EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Exemplary embodiments of the present invention relate to a power line communication (PLC) system for use in a vehicle. The PLC system may provide a unified broadband network that enables a wide variety of vehicle devices to communicate with one another that have traditionally been communicatively isolated. The PLC system may provide direct current (DC) power and data communications to a variety of PLC-enabled devices through a single PLC bus. The PLC bus may include a bulk power conditioning unit that reduces electrical noise on the bus, and replaces the power conditioning circuitry that would otherwise be included in each PLC device separately, thereby reducing the complexity and cost of the devices connected to the PLC bus. The PLC bus may also enable aftermarket accessories to be easily and inexpensively added to the vehicle. Additionally, in some exemplary embodiments, the PLC system may enable various devices in the vehicle to communicate with a service provider through an electrical power grid such as Smart Grid. As used herein, the term "Smart Grid" is used to refer to an electrical grid that enables an electric utility to manage power usage of devices coupled to the electrical grid by communicating with the devices through the electrical grid.

Figure 1:
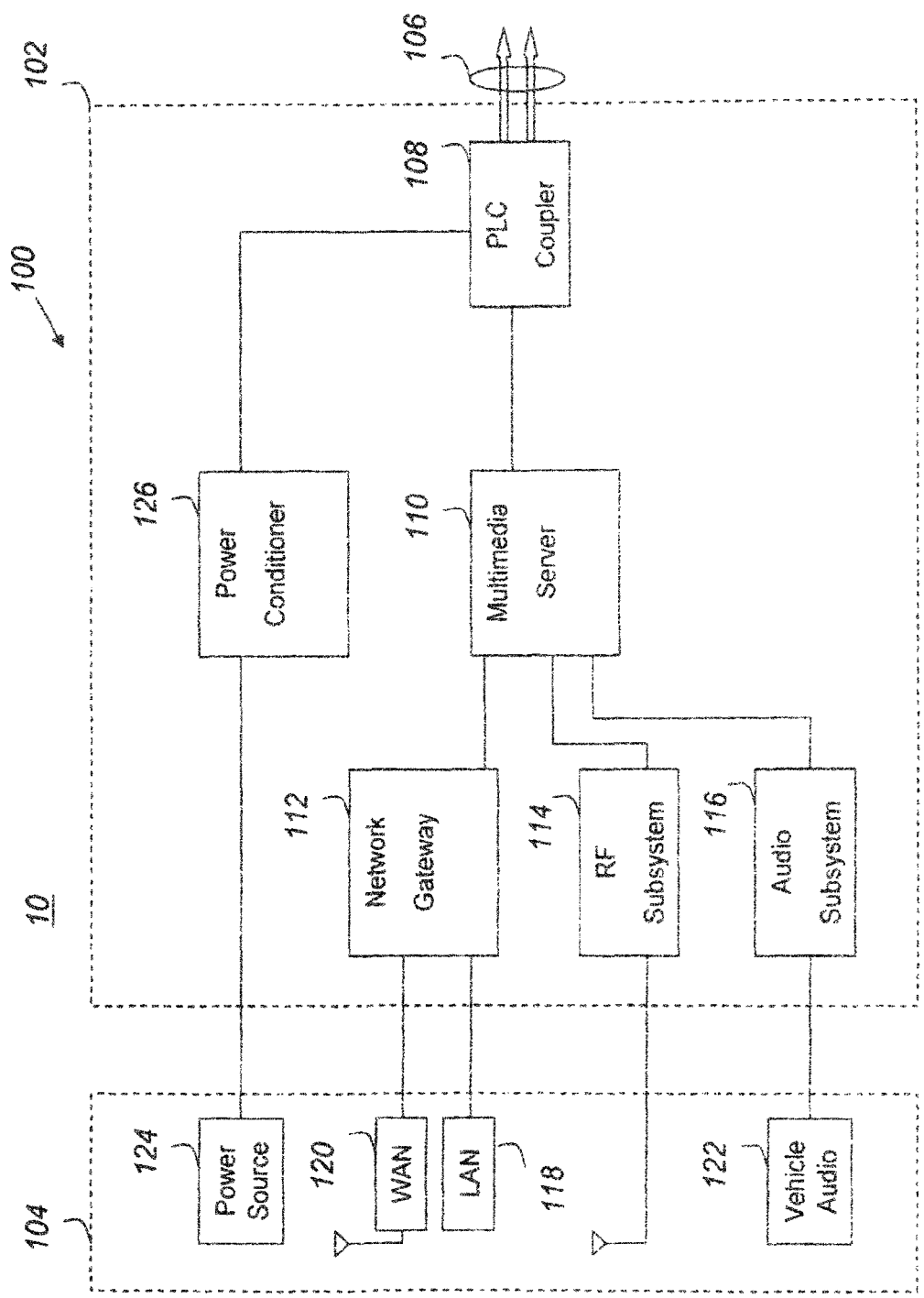
FIG. 1 is a block diagram of a vehicle having a system in which a PLC server is coupled to various vehicle systems and provides power and data communication over a PLC bus, in accordance with an exemplary embodiment of the present invention.

FIG. 1 is a block diagram of vehicle 10 having a system 100 in which a PLC server 102 is coupled to various vehicle systems 104 and provides power and data communication over a PLC bus 106, in accordance with an exemplary embodiment of the present invention. The PLC server 102 may include a PLC coupler 108 that provides electrical power and data communications to a PLC bus 106. In some embodiments, the PLC coupler 108 may provide 12 volts DC power to the PLC bus 106. The PLC coupler 108 may also include a communications port that is coupled to the PLC bus 106 and provides high-speed data transmission over the PLC bus 106, for example, 200 to 400 megabit per second. In some exemplary embodiments, the PLC coupler 108 may comprise an HD-PLC coupler available from various sources including Panasonic Corporation.

The PLC server 102 may also include a multimedia server 110 that is coupled to a second communications port of the PLC coupler 108 and provides an interface between the devices coupled to the PLC bus 106 and various other vehicle systems, for example, a network gateway 112, an RF subsystem 114, and an audio subsystem 116. In some exemplary embodiments, the multimedia server 110 may be a network access server (NAS) that protects the devices coupled to the PLC bus 106 from unauthorized access. For example, the multimedia server 110 may include a hardware-based or software-based firewall that authenticates data transmitted to the multimedia server 110 to prevent unauthorized access to the multimedia server 110 and the devices coupled to the PLC bus 106.

The multimedia server 110 may be communicatively coupled to the PLC coupler 102 through internet protocol (IP) interface for transmitting data packets to and from the devices coupled to the PLC bus 106. Communication between the multimedia server 110, the network gateway 112, the RF subsystem 114, the audio subsystem 116, and the devices coupled to the PC bus 106 may be based on any of a large number of network technologies. The specific network technology chosen for a given application may vary based on design considerations for the specific application. By way of example, a universal serial bus (USB) may be used to carry Ethernet packets containing TCP/IP encoded data. Furthermore, communication between the multimedia server 110, the network gateway 112, the RF subsystem 114, the audio subsystem 116, and the devices coupled to the PC bus 106 may be performed using a single communications protocol.

The network gateway 112 may be used to provide an interface between the multimedia server 110 and other communications networks included in the vehicle such as a local area network (LAN) 118 and a wide area network (WAN) 120. The LAN 118 may enable the multimedia server 110 to communicate with various devices in or around the vehicle, such as a mobile phone, laptop computer, and the like. The LAN 118 may use any suitable communications protocol, for example, WiFi, Zigbee, Bluetooth, and the like. The WAN 120 may be a wireless network that enables the multimedia server 110 to communicate with a remote service provider, for example, an internet service provider (ISP), a cellular network, and the like. The WAN 120 may include a modem or any other kind of interface device used for interconnection.

The RF subsystem 114 may be used to receive any type of radio transmissions, for example, AM radio, FM radio, digital radio, satellite radio, global positioning system (GPS) signals, and the like. The RF subsystem 114 may be used to receive music and television broadcasting, road traffic data, location data for use in a GPS navigation system, and the like. The RF subsystem 114 may be coupled to the multimedia server 110 through a serial bus interface such as an Inter-IC Sound (I2S) interface for transmitting audio data and other signals to the multimedia interface 110. The RF subsystem 114 may also be coupled to the multimedia server 110 through an IP interface, which may be used to receive control signals from the multimedia server 110, for example, frequency tuning signals, and the like.

The audio subsystem 116 may be used to deliver amplified audio signals to the vehicle audio system 122, which may include one or more audio speakers distributed throughout the cabin of the vehicle. The multimedia server 110 may be coupled to the audio subsystem 116 through a serial bus interface such as an I2S interface for receiving audio data from the multimedia server 110. The audio subsystem 116 may also be coupled to the multimedia server 110 through an IP interface, which may be used to receive control signals from the multimedia interface 110, for example, volume, balance, fade, bass, and treble controls, and the like.

The PLC server 102 may receive electrical power from a power source 124 included in the vehicle, for example, a vehicle battery or battery farm in the case of an electric or hybrid vehicle. In some exemplary embodiments, the power source 124 may provide 12 Volt DC power to the multimedia server 110 and the PLC coupler 108. Furthermore, the PLC server 102 may also include a power conditioner 126 to reduce electrical noise introduced through the power source 124. In some embodiments, the power conditioner 126 may be a coupled in series between the power source 124 and the multimedia server 110 and between the power source 124 and the PLC coupler 108, as shown in FIG. 1. In this way, electrical noise may be reduced within the PLC server 102 and the PLC bus 106 by a single power conditioner 126, thereby eliminating the use of additional power conditioning units within the devices coupled to the PLC bus 106. The power conditioner 126 may include any suitable voltage regulator and may include a variety of active and passive components such as one or more inductors, capacitors, diodes, and the like. The exemplary PLC server 102 described herein may enable improved connectivity between the vehicle systems 104 and the devices coupled to the PLC bus 106. For example, the PLC server 102 and the devices coupled to the PLC bus 106 may use a common communication protocol, for example, TCP/IP based communications. Using a common communication protocol enables seamless communications between the vehicle systems 104 and the devices coupled to the PLC bus 106. Further, the use of a high data rate PLC coupler 108, such as an HD-PLC coupler, may enable the exchange of large amounts of data, for example, video and audio data.

Figure 2:
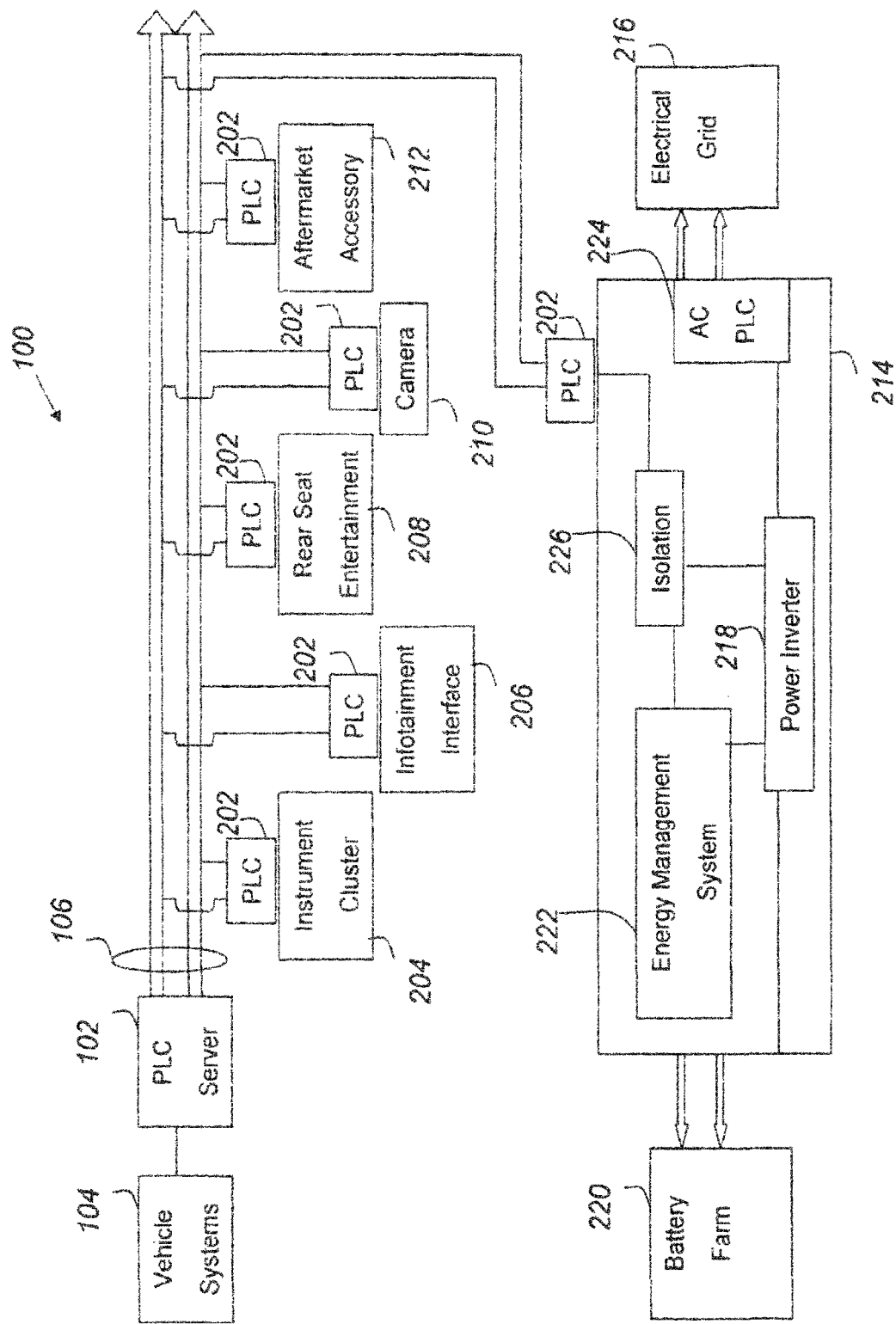
FIG. 2 is a block diagram of a system in which a PLC server is coupled to a variety of PLC devices through a PLC bus, in accordance with an exemplary embodiment of the present invention.

FIG. 2 is a block diagram of the system 100 shown in FIG. 1 in which the PLC server 102 is coupled to a variety of PLC devices through the PLC bus 106. As discussed above, in relation to FIG. 1, the system may include a PLC server 102, a variety of vehicle systems 104, and a PLC bus 106, to which various PLC-enabled devices may be coupled for receiving electrical power and communicating with the PLC server 102. Each of the devices coupled to the PLC bus 106 may include a PLC interface 202. The PLC interface 202 may be used to separate the data signals from the DC voltage that powers the corresponding device.

In some exemplary embodiments, a vehicle instrument cluster 204 may be coupled to the PLC bus 106. The instrument cluster 204 may be used to provide displays and controls pertaining to the operation of the vehicle. For example, the instrument cluster 204 may include displays such as a speedometer, odometer, tachometer, engine temperature gauge, and the like. Additionally, the instrument cluster 204 may also include a variety of displays used to indicate serviceable conditions of the vehicle, for example, a "check engine" light, an oil pressure light, and the like. The instrument cluster 204 may include controls such as a cruise control device, vehicle climate controls, and the like. Coupling the instruments cluster 204 to the PLC bus 106 may enable the instrument cluster to provide electronic data regarding vehicle conditions to other devices coupled to the PLC bus 106. For example, the instrument cluster 204 may provide information regarding serviceable conditions of the vehicle, battery charge, vehicle speed, and travel data such as distance traveled, average speed, gas mileage, and the like.

In some exemplary embodiments, an infotainment interface 206 may be coupled to the PLC bus 106. The infotainment interface 206 may provide any variety of suitable information and entertainment functions. For example, the infotainment interface 206 may include a display screen for rendering visual content and an audio system for playing audio content, either separately from the displayed content or as part of an audio/video program. The audio system of the infotainment interface 206 may have a headphone jack to allow content to play without interfering with other audio that may be playing on the vehicle audio system 122. Controls for the infotainment interface 206 may be built into the display screen, such as controls along the edge of the display screen or the use of a touch screen. Alternately, the controls for the infotainment interface 206 may be included in a proximate structure, such as a center console or an armrest, to enable ease of access.

The infotainment interface 206 may include a GPS navigation system. Accordingly, the display may provide a variety of GPS navigation data, such as maps, current location, route guidance, and the like. The infotainment interface 206 may also enable the selection of various GPS navigation features, for example, trip planning, destination entry, point-of-interest searching, and the like. With reference to FIG. 1, the GPS navigation system may communicate with the multimedia server 120 though the PLC bus 106 to send and receive a variety of data. For example, the GPS navigation system may receive location data from the multimedia server 110. In such an embodiment, the RF subsystem 114 may receive satellite signals, which may be converted in to a digital format and transmitted to the PLC bus 106 through the multimedia server 110. The GPS navigation system may also receive map updates, which may be received by the multimedia server 110 through the WAN 120. In some embodiments, the GPS navigation system may enable a point-of-interest search which may be transmitted over the WAN 120 to a service provider that processes the search and returns the requested point-of-interest location back to the GPS navigation system.

The infotainment interface 206 may also include a radio system that may include AM, FM, and satellite radio systems. The infotainment interface 206 may include one or more optical drives to access information such as navigational maps, music CDs, DVDs, or writable CD drives, e.g., for downloading and storing program information. In some embodiments, the infotainment interface may enable audio and video data to be shared with other devices coupled to the PLC bus 106, for example, a rear seat entertainment console 208. Furthermore, the rear seat entertainment console 208 may communicate with the multimedia server 110 to receive content. For example, the rear seat entertainment console 208 may be configured to allow passengers to request content from the multimedia server 110 or a remote service provider through the WAN 120, without the intervention from the vehicle operator.

The infotainment interface 206 may also include a vehicle systems interface to access and control various vehicle systems, such as the climate controls, window defrosting controls, and engine information displays, among others. In some embodiments, vehicle system information may be received from the instrument cluster 204, and vehicle system commands such as climate control commands may be sent from the infotainment interface 206 to the instrument cluster 204. The infotainment interface 206 may also display video data received from a camera 210. The camera 210 may be located externally at the rear of the vehicle and may be used to provide a view of the rear of the vehicle when the vehicle is in reverse. In some embodiments, the infotainment interface 206 may also include a Web browser for accessing the Internet through the WAN 120.

In some exemplary embodiments an aftermarket accessory 212 may be coupled to the PLC bus 106. The aftermarket accessory 212 may be any suitable type of electronic device, for example, an additional video display, an MP3 player, a radar detector, a laptop computer, an interactive entertainment console such as an Playstation®, or Xbox®, a GPS navigator, mobile phone, and the like. The vehicle may include any number of ports throughout the vehicle by which to access the PLC bus 106 for installing the aftermarket accessory 212. In this way, any number of the aftermarket accessories 212 may be easily and inexpensively added without extensive rewiring. It should be understood that the operations of the system 100 are not limited to these examples. Indeed, the system 100 may perform any number of tasks programmed by the user or vehicle designer.

In some exemplary embodiments, the system 100 may be included in an electric or plug-in hybrid electric vehicle. In such embodiments, the vehicle may include a power system 214 that may be coupled to an electrical grid 216 for charging of the vehicle battery farm 220. In one embodiment hereof, battery farm 220 consists of a plurality of electrically interconnected batteries. However, it is to be understood that battery farm 220 can be alternately configured as a single battery or as several batteries electrically connected into in one or more groups or cells. As used herein, the term "electrical grid" is used to refer to any suitable electrical distribution network provided, for example, by an electric power utility or other electrical generation and distribution facility. In some embodiments, the electrical grid may be a Smart Grid that provides electrical power as well as electronic communications.

In some exemplary embodiments, the power system 214 may include a power inverter 218. The power inverter 218 may a bi-directional power inverter that is capable of operating in a charge mode or a generation mode. During charge mode the power inverter 218 provides AC to DC conversion for charging the vehicle battery farm 220 from the electrical grid 216. The power inverter 218 may include any suitable rectifier for converting AC power received from the electrical grid 216 into DC power for charging the battery farm 220. For example, the power inverter 218 may include a switched-mode power supply, silicon-controlled rectifier (SCR), bridge rectifier, and the like. During generation mode the power inverter 218 provides DC to AC conversion for generating power to be delivered back to the electrical grid 216. The power inverter 218 may include any suitable AC inverter for converting the DC power provided by the battery farm 220 into AC power that may be delivered to the electrical grid 216. For example, the power inverter 218 may include an SCR inverter, insulated gate bipolar transistor (IGBT) inverter, and the like.

In some exemplary embodiments, the power system 214 may also include an AC PLC coupler 224 used for sending and receiving electronic data through the electrical grid 216. For example, the power system 214 may be coupled through the electrical grid 216 to a communications center of an electrical utility. Data received from the electrical grid 216 may be transmitted through the power inverter 218 to an energy management system 222 included in the power system 214. The energy management system 222 may include a processor and other circuitry used to switch the power inverter 218 between charge mode and generation mode. In some embodiments, the energy management system 222 may receive data from the electrical utility that relates to electrical rates, electrical availability, and the like. The energy management system 222 may use this data to determine whether to operate the power inverter 218 in charge mode or generation mode. For example, the energy management system 222 may initiate the charge mode during off-peak electricity usage periods, during which the demand on the electrical grid 216 may be lower and the electricity rates reduced. The energy management system 222 may initiate generation mode during electrical shortages or during peak electricity usage periods, during which the demand on the electrical grid 216 may be higher and the electricity rates increased.

In some exemplary embodiments, the power system 214 may also be coupled through a PLC interface 202 to the PLC bus 106. The power system 214 may also include isolation circuitry 226 for isolating the PLC bus 106 from the energy management system 222 and the power inverter 218. For example, the isolation circuitry 226 may include transformers, low pass filters, and the like. By coupling the power system 214 to the PLC bus 106, the energy management system 222 may interface with various other devices in the PLC system 100. In some embodiments, the energy management system 222 may receive travel data from the instrument cluster 204 or the GPS navigation system included in the infotainment interface 206. For example, the travel data may include a recorded driving history, for example, information regarding prior trips such as distance, driving time, electricity usage, average speed, vehicle usage periods, and the like. The travel data may also include future trips, which may be received from a trip-planning feature of the GPS navigation system. The driving history and future trips may be used by the energy management system 222 to estimate future energy needs and determine a charging/generation schedule that optimizes energy usage. For example, if the driving history or future trips suggest that the vehicle is likely to use a large amount of electricity, the energy management system 222 may compute a charging/generation schedule that provides a full battery charge when the vehicle will likely to be used. If the driving history or future trips suggest minimal vehicle usage such as short trips to and from work, the energy management system 222 may compute a charging/generation schedule that sells excess stored battery charge back to the electrical grid 216, for example, during peak electricity usage periods.

The energy management system 222 may also provide information to devices coupled to the PLC bus 106. For example, the energy management system 222 may provide energy management data to an energy management program included in the infotainment interface 206. Using the data from the energy management system 222, the energy management program may display a variety of metrics to the user, for example, prior energy usage of the vehicle, battery charge, time and duration of previous charge/generation cycles, the electricity rate applied during the charge/generation cycles, and the like. The energy management program may also enable the user to view the charging/generation schedule computed by the energy management system 222 and manually alter the charging/generation schedule.

In some exemplary embodiments, the power system 214 may enable the devices coupled to the PLC bus 106 to access service providers through the electrical grid 216. For example, the infotainment interface 206 may be used to access account information from the user's electrical utility. This may enable the user to view an account balance, schedule payments, and the like. In some embodiments, the infotainment interface 206 may enable the user to view a customer service Website provided by the electrical utility through the electrical grid 216.

In some exemplary embodiments, the infotainment interface 202 may be used to download audio and video media through the electrical grid 216 from a service provider such as iTunes®, Netflix®, Blockbuster®, and the like. For example, the user may use the infotainment interface 206 to browse a library of media files available through the service provider and select one or more media files to download. The selected media files may then be downloaded through the electrical grid 216, for example, while the vehicle is charging. In some embodiments, the vehicle may be coupled through the electrical grid 216 to the user's home network. In this way, the user may access media files or other data files stored on the user's home computer or digital video recorder (DVR), for example. In some embodiments, the devices coupled to the PLC bus 106 may be programmed to receive software and firmware updates from a software manufacturer through the electrical grid 216. For example, the infotainment interface 206 may be programmed to download updated user interface programs, GPS navigation maps, and the like.

In some exemplary embodiments, vehicle data from the vehicle's instrument cluster 204 may be transmitted to an automotive service provider, for example, a selected vehicle dealership, auto mechanic, and the like. The vehicle data transmitted from the instrument cluster 204 may include vehicle malfunctions or other serviceable conditions detected by an on-board diagnostics system. The vehicle data may also include reminders regarding routine maintenance such as oil changes, and the like. The vehicle data may be used by the vehicle service facility to alert the owner of the vehicle regarding the need for repair or maintenance. For example, the vehicle service facility may analyze data received from the on-board diagnostics system to determine a possible malfunction. Additionally, a vehicle recall may be transmitted to the infotainment interface 206 from a dealership or a vehicle manufacturer. Messages from the vehicle service facility may be displayed by the infotainment interface 206. For example, an email message may be sent from the vehicle service facility and received by an email client of the infotainment interface 206.

In some exemplary embodiments, some or all of the electronic data received from the electrical grid 216 may be handled by the PLC server 102. For example, the multimedia server 110 (FIG. 1) may receive data packets from the electrical grid 216 and re-route the data to the corresponding device coupled to the PLC bus 106. In this way, access to the devices coupled to the PLC bus 106 may be restricted by the multimedia server 110, thereby protecting the devices coupled to the PLC bus 106 from unauthorized access. One or more devices coupled to the PLC bus 106 may receive data from the electrical grid 216 directly. In other words, packets may be delivered to and from one of the devices coupled to the PLC bus 106, such as the infotainment interface 206, without involvement of the multimedia server 110.

The exemplary system 100 provides an in-vehicle network that may couple numerous vehicle devices through a PLC network and enables the vehicle devices to communicate both internally and with external systems using a consistent communications protocol. The exemplary system 100 enables various vehicle devices to communicate with any number of suitable communications services, media providers, and the like. It will be appreciated that the system 100 functionalities described herein are only examples, and that a variety of additional features may be provided using the exemplary system 100 described herein. Furthermore, it will be appreciated that the system 100 described herein can function independently, in other words, without being coupled to the electrical grid 216.

Figure 3:
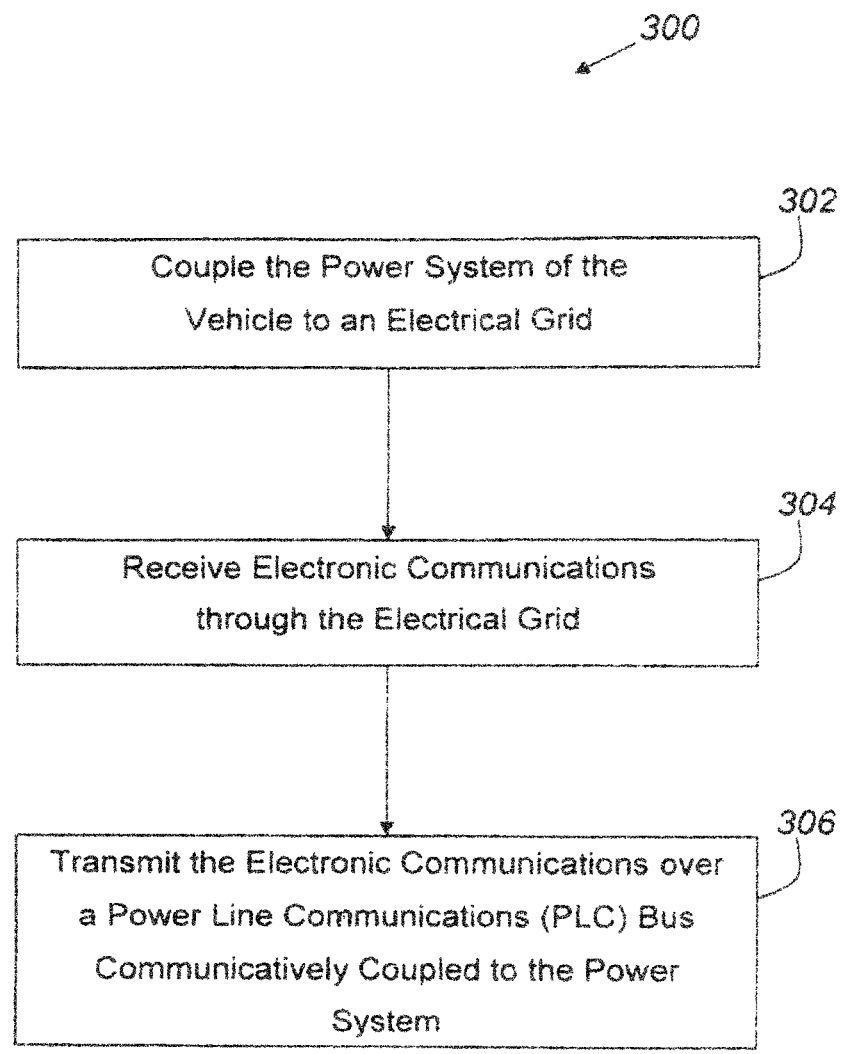
FIG. 3 is a process flow diagram showing a method for providing electronic communications in a vehicle, in accordance with an exemplary embodiment of the present invention.

FIG. 3 is a process flow chart illustrating a method 300 for providing electronic communications in a vehicle, in accordance with an exemplary embodiment. The method may begin at block 302, wherein a power system 214 of the vehicle is coupled to an electrical grid 216. Coupling the power system 214 to the electrical grid 216 enables the power system 214 to charge a battery farm 220 included in the vehicle. Furthermore, as discussed above, coupling the power system 214 to the electrical grid 216 may also enable the power system 214 to generate AC power from the vehicle battery farm 220 to sell back to the electrical grid 216.

The process flow may then advance to block 304, wherein electronic communications are received through the electrical grid 216. For example, as discussed above, the power system 214 may receive electronic data from a communications center of an electrical utility, a home network, an ISP, an automotive service provider, and the like.

The process flow may then advance to block 306, wherein the electronic communications may be transmitted over the PLC bus 106, which is communicatively coupled to the power system 214. In some embodiments, the electronic communications transmitted over the PLC bus 106 may be initially received by the multimedia server 110 (FIG. 1), which authenticates the data and re-routes the data to one or more of the devices coupled to the PLC bus 106.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A power line communication (PLC) system, comprising:
 a PLC server configured to provide electrical power and electronic communications through a PLC bus to an electronic device; and
 a power system coupled to an electrical grid for charging a battery associated with the electronic device and communicatively coupled to the PLC bus;
 wherein the electronic device is configured to communicate electronically with a remote service provider through the electrical grid, wherein the electronic device comprises a vehicle, and wherein the PLC server comprises a power conditioner that reduces electrical noise on the PLC bus.

2. A power line communication (PLC) system, comprising:
 a PLC server configured to provide electrical power and electronic communications through a PLC bus to an electronic device; and
 a power system coupled to an electrical grid for charging a battery associated with the electronic device and communicatively coupled to the PLC bus;
 wherein the electronic device is configured to communicate electronically with a remote service provider through the electrical grid, wherein the electronic device comprises a vehicle, and wherein the PLC server includes a first communications port coupled to the PLC bus and a second communications port coupled to a multimedia server.

3. The PLC system of claim 2, wherein the multimedia server is configured to send audio signals to an audio subsystem configured to provide audio signals to one or more speakers.

4. The PLC system of claim 2, wherein the multimedia server is configured to receive radio frequency (RF) signals from an RF subsystem configure to receive RF signals from at least one of an FM broadcaster, AM broadcaster, digital radio broadcaster, satellite radio broadcaster, and a global positioning system (GPS) satellite.

5. The PLC system of claim 2, wherein the multimedia server is communicatively coupled to a network gateway configured to provide network communications over at least one of a local-area network and a wide area network.

6. The PLC system of claim 5, wherein the multimedia server is configured to provide data communication between the electronic device coupled to the PLC bus and another remote service provider through the wide area network.

7. A method of providing electronic communications in a vehicle comprising:
 coupling a power system of the vehicle to an electrical grid, the power system configured to receive electrical power from the electrical grid to charge a battery included in the vehicle;
 receiving electronic communications through the electrical grid;
 transmitting the electronic communications over a power line communications (PLC) bus communicatively coupled to the power system;
 receiving electricity rates from an electrical utility through the electrical grid and switching the power system to a charge mode based, at least in part, on the electricity rates; and
 receiving travel data from an electronic device coupled to the PLC bus, and determining a charge schedule or a generation schedule based, at least in part, on the travel data.

8. A method of providing electronic communications in a vehicle comprising:
 coupling a power system of the vehicle to an electrical grid, the power system configured to receive electrical power from the electrical grid to charge a battery included in the vehicle;
 receiving electronic communications through the electrical grid;
 transmitting the electronic communications over a power line communications (PLC) bus communicatively coupled to the power system;
 receiving electricity rates from an electrical utility through the electrical grid and switching the power system to a charge mode based, at least in part, on the electricity rates; and
 receiving digital media from a remote service provider through the electrical grid, wherein the digital media includes a navigation map.

9. A method of providing electronic communications in a vehicle comprising:
 coupling a power system of the vehicle to an electrical grid, the power system configured to receive electrical power from the electrical grid to charge a battery included in the vehicle;
 receiving electronic communications through the electrical grid;
 transmitting the electronic communications over a power line communications (PLC) bus communicatively coupled to the power system;
 receiving electricity rates from an electrical utility through the electrical grid and switching the power system to a charge mode based, at least in part, on the electricity rates; and
 generating a search query for a point of interest, transmitting the search query to a remote service provider through a wide area network communicatively coupled to the PLC bus, receiving a location of the point-of-interest from the remote service provider, and displaying the location on a display of a navigation system.

10. A method of providing electronic communications in a vehicle comprising:
 coupling a power system of the vehicle to an electrical grid, the power system configured to receive electrical power from the electrical grid to charge a battery included in the vehicle;
 receiving electronic communications through the electrical grid;
 transmitting the electronic communications over a power line communications (PLC) bus communicatively coupled to the power system;
 receiving electricity rates from an electrical utility through the electrical grid and switching the power system to a charge mode based, at least in part, on the electricity rates; and sending data corresponding to a condition of the vehicle from an instrument cluster coupled to the PLC bus to an automotive service provider through the electrical grid.

11. A vehicle, comprising:
a power line communications (PLC) bus configured to carry electrical power to a plurality of electronic devices in the vehicle and to carry electronic communications between the plurality of electronic devices; and
a power system coupled to an electrical grid for charging a battery of the vehicle and communicatively coupled to the PLC bus for providing electronic communication through the electrical grid between one of the plurality of electronic devices coupled to the PLC bus and a remote service provider, the power system being configured to switch the power system between a charge mode and a generation mode based, at least in part, on data received from an electrical utility through the electrical grid and travel data received from one of the plurality of electronic devices coupled to the PLC bus.

12. The vehicle of claim 11, comprising a power source configured to power the plurality of electronic devices coupled to the PLC bus and a power conditioner coupled in series between the power source and the PLC bus and configured to reduce electrical noise in the PLC bus.

13. A power line communication (PLC) system, comprising:
a PLC server configured to provide electrical power and electronic communications through a PLC bus to an electronic device; and
a power system coupled to an electrical grid for charging a battery associated with the electronic device and communicatively coupled to the PLC bus, wherein the power system comprises an energy management system configured to switch the power system between a charge mode and a generation mode based, at least in part, on electricity rate data received from an electrical utility through the electrical grid;
wherein the electronic device is configured to communicate electronically with a remote service provider through the electrical grid, and wherein the PLC server comprises a power conditioner that reduces electrical noise on the PLC bus.

* * * * *